Oct. 20, 1925.

J. B. GOLDSBOROUGH

UNDERPINNING

Filed Oct. 31, 1918    4 Sheets-Sheet 1

1,558,430

INVENTOR
John B. Goldsborough
BY
Henry Moseley
ATTORNEY

Oct. 20, 1925.

J. B. GOLDSBOROUGH

UNDERPINNING

Filed Oct. 31, 1918

Oct. 20, 1925.  1,558,430
J. B. GOLDSBOROUGH
UNDERPINNING
Filed Oct. 31, 1918   4 Sheets-Sheet 3

INVENTOR
John B. Goldsborough
BY
ATTORNEY

Oct. 20, 1925. 1,558,430
J. B. GOLDSBOROUGH
UNDERPINNING
Filed Oct. 31, 1918 4 Sheets-Sheet 4
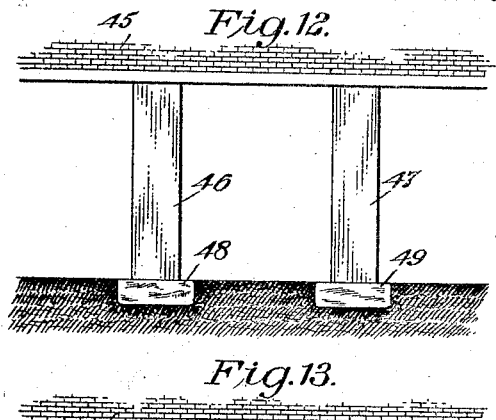
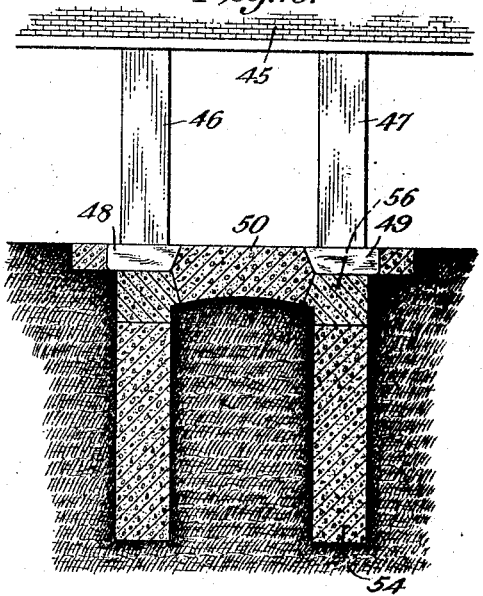
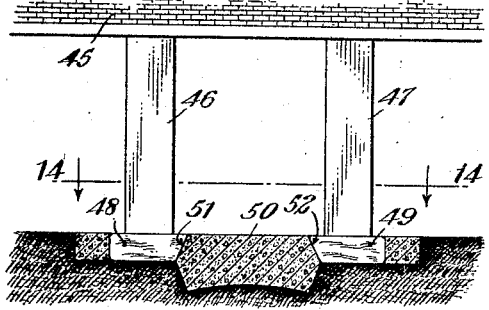
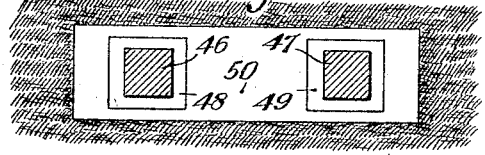
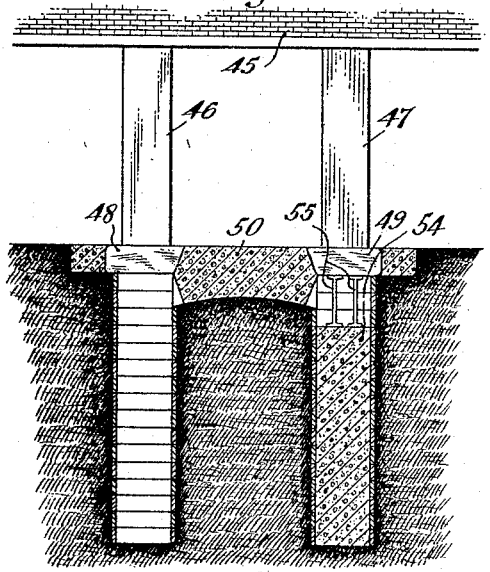
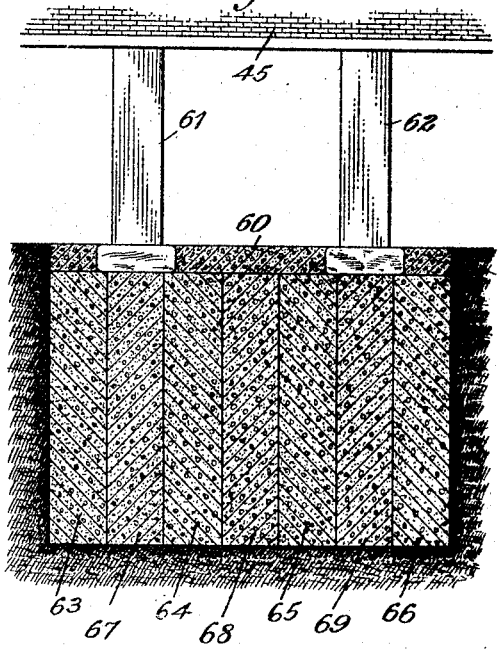
INVENTOR
John B. Goldsborough
BY
Harry Moakley
ATTORNEY Patented Oct. 20, 1925.

1,558,430

UNITED STATES PATENT OFFICE.

JOHN B. GOLDSBOROUGH, OF CROTON-ON-HUDSON, NEW YORK.

UNDERPINNING.

Application filed October 31, 1918. Serial No. 260,514.

*To all whom it may concern:*

Be it known that I, JOHN B. GOLDSBOROUGH, a citizen of the United States, residing at Croton-on-Hudson, in the borough of Westchester, State of New York, have invented new and useful Improvements in Underpinning, of which the following is a specification.

This invention relates to methods of underpinning buildings and has for its object the provision of an underpinning and a method of constructing the same which may be carried out at practically a small percentage of the cost of underpinning buildings in accordance with the practices heretofore existing and without disturbing the occupancy of the building during the operations.

Other objects of the invention will be apparent from the detailed description hereinafter to follow when taken into conjunction with the accompanying drawings and will be pointed out in the appended claims.

In the drawings:—

Fig. 12 shows a foundation consisting of isolated piers;

Fig. 13 shows a concrete footing bonding the piers together;

Fig. 14 is a section of Fig. 13 on the line 14—14;

Fig. 15 shows the method of constructing the piers beneath the concrete footing;

Fig. 16 shows the completed underpinning; and

Fig. 17 shows a curtain wall erected beneath two isolated piers bonded together by a concrete footing.

Figure 2:
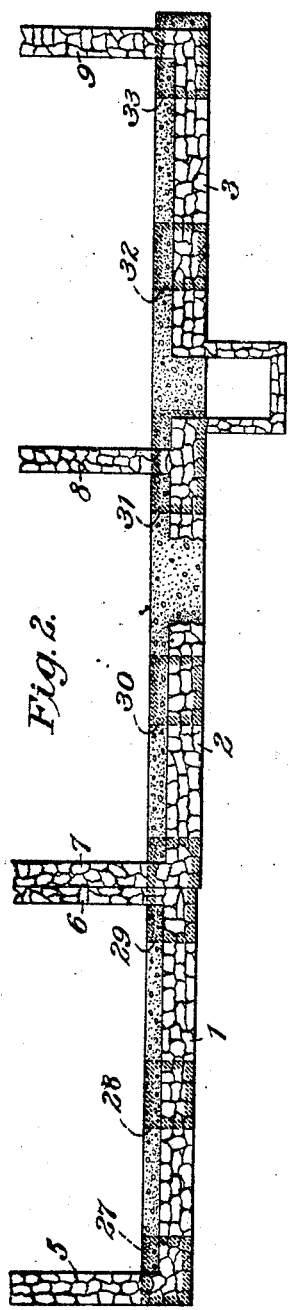
Fig. 2 is a section of Fig. 1 on the line 2—2.

In excavating for subways along an existing line of buildings or other instances where the lateral support adjacent to a building is removed, it is necessary to underpin the building in such a manner that the weight or load of the building will be transferred to a greater depth and supported substantially independent of its previous foundation, which will, in a large measure, be removed either temporarily or permanently.

Heretofore, it has been the common practice to provide temporary extraneous supports and to emplace the underpinning in position while the building is thus supported. These extraneous supports have sometimes been needles or props arranged to give a wide distribution of the weight or load of the building upon the adjoining earth. Hydraulic jacks have also been found to be of advantage in supporting a building during underpinning operations, which jacks directly sustain the load or weight of the building and do not require any temporary supports such as needles, which seriously affect the occupancy of the building during the underpinning operations.

In the subsequent development of the hydraulic jack method I have proposed an extended reinforced concrete footing for a building under which the hydraulic jacks have been placed to temporarily support the building until permanent concrete piers have been constructed and joined to the footing to form the permanent underpinning structure. I have also proposed to use such an extended reinforced footing and instead of supporting the building upon hydraulic jacks, to sustain it upon the earth while pits are sunk at one side of the footing and filled with concrete to provide concrete piers which are thereafter joined to the footing to provide the finished or completed underpinning.

In the development of underpinning methods, as above outlined, I have found that in general it has been, and now is, the general practice to employ supports of some character for the buildings when concrete piers are to be sunk directly beneath the foundation wall, which are to a large extent, unnecessary if proper precautions are taken in placing the underpinning. This is due to the fact that heretofore, in so far as I am aware, the arching action of a foundation wall and the arching action of the earth or soil when undisturbed, has not been properly taken into consideration as a factor in the support of a building during underpinning operations. I have found that the arching action or quality of an ordinary foundation wall is sufficient, in a great many cases, to temporarily sustain a building even though a section of the earth directly beneath the wall is excavated. This foundation wall may be of any of the usual types at present used, as for example, a rubble wall, a brick wall, and the like. Of course, in a case where a building is sustained upon isolated foundation piers, a footing would necessarily be used to join the supporting columns together, which would be the equivalent of a foundation wall.

This arching quality or characteristic of a foundation wall, is naturally dependent upon the firm support of the portion of the earth remaining beneath the wall which has not been excavated, and therefore, for the proper success in the carrying out of the method as will be hereinafter outlined, care must be taken that the earth surrounding the excavated section should not be seriously disturbed. This theory of the arching action and of a wall and undisturbed ground, has resulted in the perfection of a new method of underpinning which may be constructed at a fraction of the cost of the old type, due to the fact that it does not necessitate steel for reinforcing purposes, is simple to construct, and provides a permanent rigid underpinning which will be adequate to sustain any load or weight placed upon it under the most exacting conditions.

One manner in which my new method of underpinning may be carried out, results in the production of a pier and arch underpinning for a foundation wall which underpinning structure is constructed entirely of concrete masonry or the like and need not be reinforced by steel rods, beams, or any other form of reinforcement which heretofore have been deemed necessary. In constructing this underpinning a section of the earth directly beneath or in alignment with the foundation wall to be underpinned is excavated by the method shown in my Patent No. 1,143,184 for a method of lining an excavation and horizontal sheathing, dated June 15, 1915, or by an equivalent method of sheathing which will permit a pit to be sunk in the earth beneath a foundation wall without disturbing the earth contiguous to the pit and the foundation wall above it. In brief, this is preferably accomplished by sinking the pit in increments and lining the pit with horizontal sheathing as the depth increases. Openings are preferably provided in this sheathing to permit a tamping of the earth back of the same so that it will not be permitted to settle or otherwise be disturbed. This pit may be of any desired dimension, depending upon the building to be underpinned and is sunk directly beneath the foundation wall. After the pit has been completed the portion of the wall directly over the pit is unsupported and the arching action of the foundation wall is sufficient to sustain temporarily the load of the building without any danger of a settlement of a portion of the wall or building. After the pit has been sunk in this manner, it is filled with concrete or masonry to provide a permanently sustaining or underpinning pier. Temporary supports are then placed between the top of the completed pier and the foundation wall. These supports, I believe, are especially desirable where the wall is of a poor quality, or the section of earth which is subsequently removed from beneath the wall, is large. With the portion of the foundation wall supported by these temporary supports which may be steel I-beams, wooden beams, props, or the like, a second pit is sunk in the same manner at some distance from the first pit and a second concrete pier is constructed. Temporary supports may also be utilized to support the foundation wall and the earth between the pits is then excavated and concrete arch is then formed in the excavated trough which is joined to the piers to provide the completed underpinning for a section of the building. The span between the two piers is built directly beneath the foundation wall which will thereafter rest upon it. It is to be understood that while an arch is preferably constructed between the piers for economic reasons, yet a concrete beam having the same arching qualities or characteristics as the arch may be utilized, the excess quantity of concrete thus used being of no value. A span of concrete underpinning constructed in the manner described, is capable of sustaining a rubble or other type of foundation wall in conjunction with the supporting piers under the most exacting conditions and I have found that even if part or all of the earth between the piers is removed, after it is emplaced, the pier and arch support will sustain the building without any settling of the same since the weight has been transferred to the piers. If desirable, other piers may be constructed instead of the concrete span and a curtain wall obtained. I have also observed that during the construction of the underpinning there is no danger of injury to the building, due to the fact that it is adequately supported by the earth and the sections of the underpinning as they are completed. These observations have extended over a large number of buildings which have been underpinned in accordance with my method.

Figure 1:
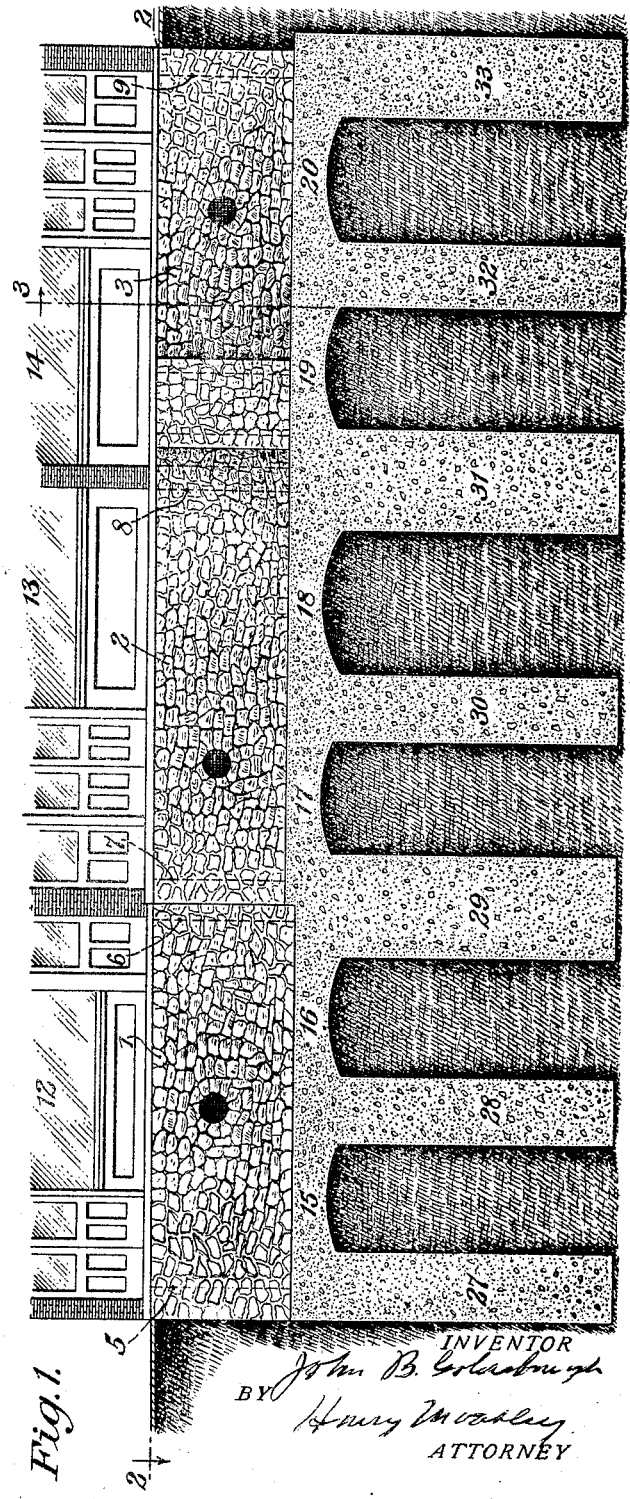
Fig. 1 shows in side elevation a portion of a building, its foundation and its underpinning, which have been constructed in accordance with the principles of this invention.
Figure 3:
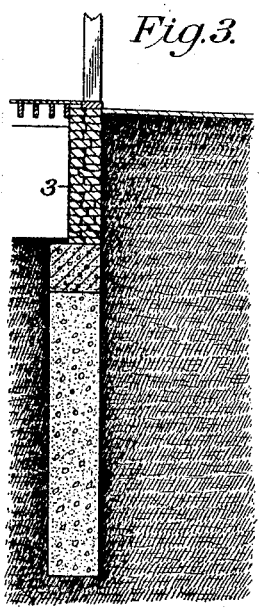
Fig. 3 is a vertical section on the line 3—3 of Fig. 1.

One form of completed underpinning is shown in Figs. 1 and 2, and in these views 1, 2 and 3 illustrate rubble foundation walls which are adjacent to a side walk and street under which a subway is to run, which makes it essential and necessary to underpin the buildings. The walls 1, 2 and 3 face upon the street and are, as is the usual construction, connected to the side walls 5, 6, 7, 8 and 9, the side walls 6, 7 and 8 being party walls of the usual type. These foundation walls may support any usual type of buildings, as for example, brick buildings as is indicated at 12, 13 and 14. The underpinning of this series of buildings shown comprises a plurality of concrete piers 27, 28 and 29, etc., which are joined together at their tops by arches 15, 16 and 17, which arches as is clear from Fig. 1, are directly beneath the rubble walls which rest upon the same so that these concrete arches or spans serve as a footing not only to sustain the weight of the building in conjunction with the concrete piers, but also to increase the strength of the foundation wall of the building.

In so far as I am aware, it has never been contemplated to use a concrete pier and arch of this character and it is my intention to cover this underpinning structure as well as the method of placing it in position, as will now be described.

Figure 4:
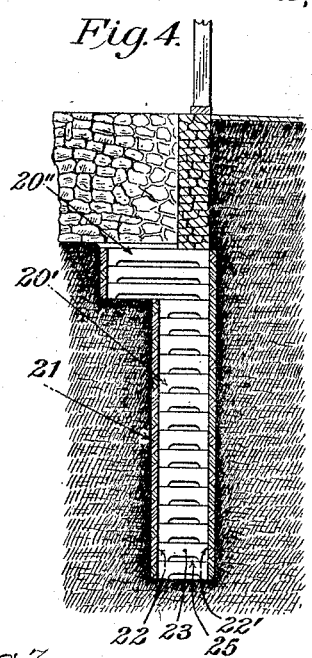
Fig. 4 is a detail of the construction utilized in forming a pit for a concrete pier which forms a part of the underpinning.
Figure 5:
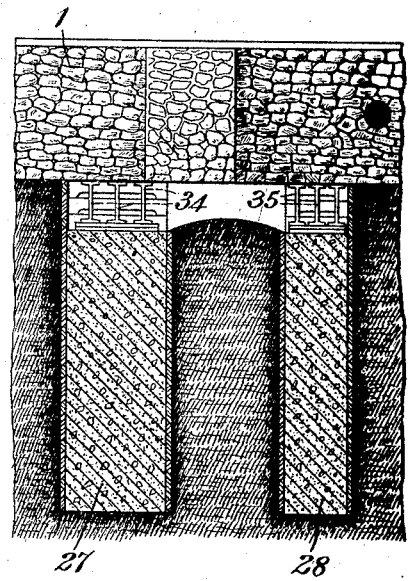
Fig. 5 shows a further step in the underpinning.
Figure 6:
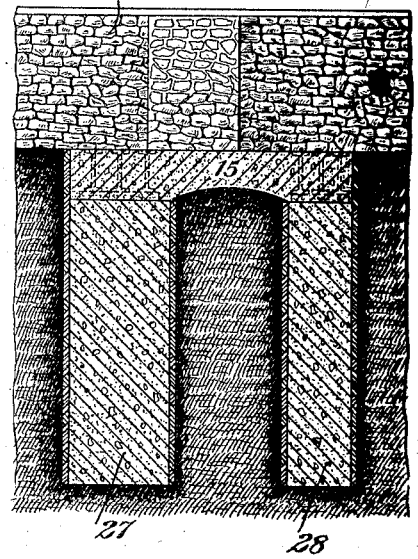
Fig. 6 shows one completed form of underpinning.

Referring first to Figs. 4, 5, and 6, one method in which the concrete pier and arch underpinning structure may be constructed is shown, the illustration being limited to two piers with the span or arch of concrete which joins the two, it being understood that the method of constructing the other piers and spans is the same. The first step in the operation of underpinning is shown in Fig. 4. Here a pit 20′ is sunk beneath a section of the underpinning wall, access to the pit being provided by means of the opening 21′. This pit is sunk preferably in accordance with the method outlined in my patent before referred to, that is, by sinking the pit in successive sections which sections are lined with horizontal sheathing as the pit increases in depth. This sheathing is shown at 21 and consists of horizontal side boards 22 and 22′ which are joined by end boards 23, the opposite end boards not being shown. The end boards fit against the side boards to mutually support each other and serve as braces to prevent any collapse of the sheathing. In sinking this pit and lining it with this horizontal sheathing as described, care should be taken to avoid any disturbance of the earth adjoining the pit and if during the excavating operations any of this earth appears to be loose or liable to flow due to the weight or the load upon it, the earth to the rear of the base is tamped until hard and if necessary the space between the boards and the earth is filled with some suitable packing material so that the earth around the outside boards is packed against the same to prevent any disturbance of the earth. These tamping and filling operations may be effected through the slots indicated 25. It is of course to be understood that the necessity for lining the pit or for filling the spaces outside of the sheath boards with earth or other material, is dependent upon the earth in which the pit is sunk, it being obvious that if the earth is firm and hard, it is unnecessary to take these precautions since the reason for lining the pit or for filling the spaces back of the lining is to insure that there will be no disturbance of the earth adjoining the pit due to the extra load which is placed upon it by the excavation of the pit. After the pit is sunk as disclosed in Fig. 4, the same is filled with concrete or masonry to provide a pier 27 (see Fig. 5). It will be noted from this view that the pier is constructed so that it does not extend to the bottom of the foundation wall but a space is preferably left in which is interposed temporary supports 34. These temporary supports may be I-beams as is shown in Fig. 5, or may be wooden beams or props, or any other form of temporary support which will receive the weight or load of a portion of the foundation wall and transmit it to the completed concrete pier. After the pier 27 and temporary support 34 have been emplaced, a second pit is excavated at some distance from the pier 27 and a pier constructed in the pit in the manner already described. The distance between these two piers is dependent upon the character of the foundation wall and the load which it is to support, as for example, as shown in Fig. 1 the pier 27 is erected at one corner beneath the walls 1 and 5, the pier 29 beneath the party walls 6 and 7, the pier 31 beneath the wall 8 and the pier 33 beneath the party wall 9. Piers 28, 30 and 32 are also placed intermediate the other piers. It is of course understood that other intermediate piers may be utilized if the foundation wall is poor or the building extremely heavy. After the pier 27 has been constructed in the manner described, the pier 28 will be constructed in the same manner and a structure similar to that shown in Fig. 5 will be produced, it being understood that temporary supports 35 also connect the pier 28 to the rubble foundation wall, to support the weight of the same. It may also here be noted that the boards which line the pit or excavations for the piers need not be removed, as in some instances it is preferable not to remove them, due to the danger of disturbing the earth which is held in place by the boards. After the two piers have been constructed in the manner described and the temporary supports placed in position, space for the arch or span is formed by excavating the section of the earth directly beneath the foundation wall which is intermediate the two piers. In excavating this section it has been found that after the piers have been sunk and the temporary supports placed in position, it is unnecessary in some cases, to line the excavation in which the arches or spans are to be constructed since the two piers will form adequate support for the buildings. If desired, however, this trough may also be lined with boards which will serve as a mould and a more perfect arch in this manner be obtained. After the excavation has been made the construction will appear as in Fig. 5 and the concrete spans then cause the temporary supports to be lost in the cast as shown in dotted lines in Fig. 6. The construction will then appear as shown in Fig. 6, which discloses a completed section of the underpinning and comprises two concrete piers connected at their upper ends by a concrete span or arch 15. The foundation wall rests directly on the concrete arch so that not only an underpinning support is obtained which transfers the load of the building to the piers and hence to a greater depth, but also a footing for the foundation wall which will serve to maintain the foundation wall rigidly in position. It will be noted that during this underpinning operation only a small section of the foundation wall remains unsupported at any time and I have found that this unsupported section of the foundation wall, due to its arching qualities or characteristics, will not give away or break down under the load or weight of the building. In some instances the foundation wall has been so poor that several stones have been dropped into the pit during the excavation which made it necessary to provide temporary props or supports for the wall which will support the wall and perhaps a portion of the weight of the building. However, even under these circumstances, the arching quality or characteristic of the wall will support the major portion of the weight of the building without any settling of the same which would cause cracks to appear in the building. It is also to be noted that if I-beams are not used as temporary supports, but wooden posts or beams used, no steel at all is used in the construction of the underpinning, either during the underpinning operations or in the completed structure. This fact has resulted in an enormous saving and has permitted in every instance, the underpinning of buildings to go on uninterruptedly, where no supply of steel was to be had.

Figure 7:
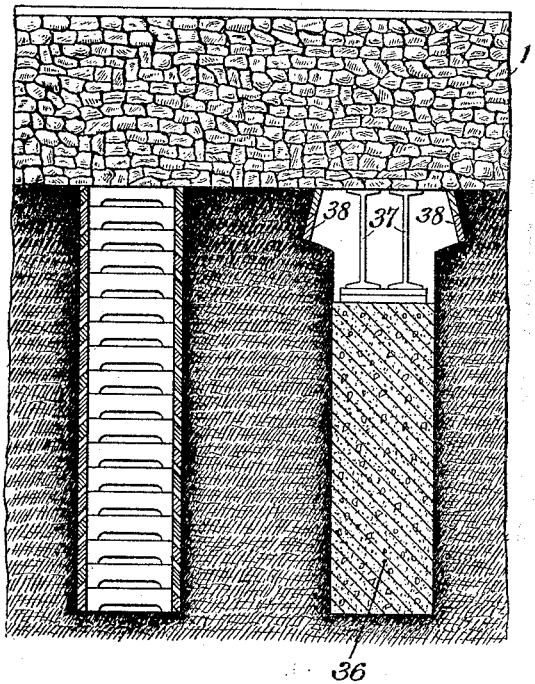
Fig. 7 is a view similar to Fig. 5, of a modified form of underpinning.
Figure 8:
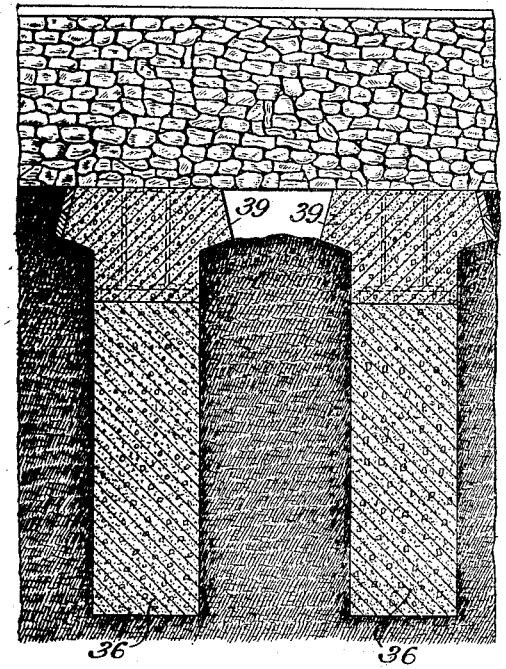
Fig. 8 shows a further step in the method used in Fig. 7.
Figure 9:
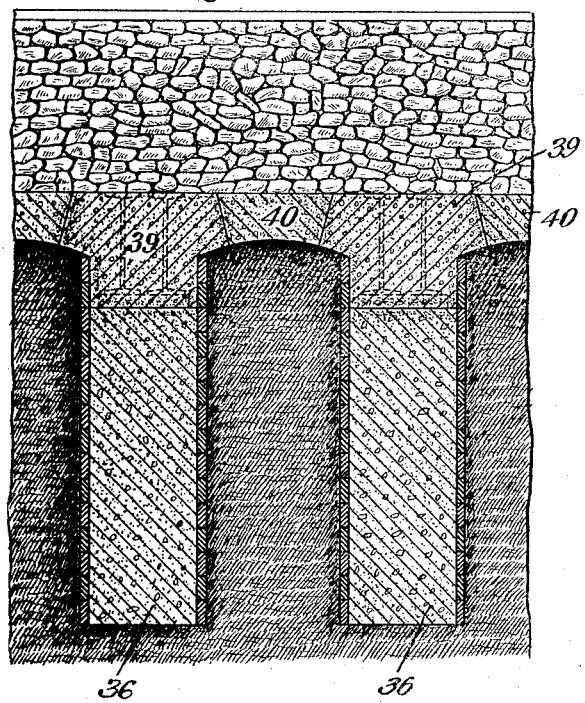
Fig. 9 shows the underpinning disclosed in Figs. 7 and 8 completed.

Referring now to Figs. 7, 8 and 9, a somewhat modified construction is shown. Here the pits are sunk in the same manner but instead of casting the entire concrete span at a single operation, a pier 36 is first constructed, and then a haunch for the arch is constructed, as shown in Fig. 7, after the temporary supports 37 have been placed in position. In order to mould this haunch, boards 38 which serve as a mould, may be used. After the two haunches 39 for the arch are constructed as shown in Fig. 8, the section of the earth intermediate the haunches is excavated and the key 40 of the arch is then cast to provide a completed underpinning as shown in Fig. 9. In some instances this method is preferable where the foundation wall is in poor condition, since, as will be clear from Figs. 7, 8 and 9, the portion of the wall which remains unsupported at any one time is much less than any form shown in Figs. 5 and 6.

Figure 10:
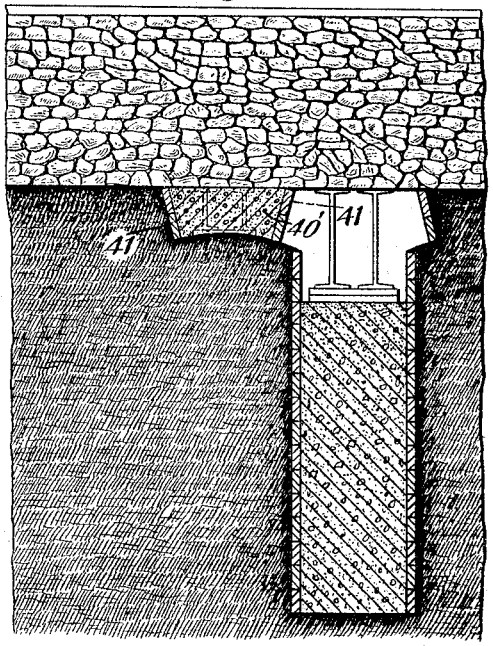
Fig. 10 shows a further modification.

Another form is illustrated in Fig. 10. Here the key of the arch is cast prior to the excavations of the pits for the concrete piers. The excavation is made without disturing the foundation wall as has already been described and, if necessary, the trough which is thus formed may be lined with boards 41 which serve as a mould during the casting of the concrete pit to provide a key section of the arch. One of the pits is then excavated and sheathed in the manner described and a temporary support placed in position after which the haunch is completed and joined to the key. In the same manner a second pier is constructed and when its haunch is completed a finished section of underpinning is obtained consisting, as before, of two piers connected together by a span or arch, the entire structure being of concrete.

Figure 11:
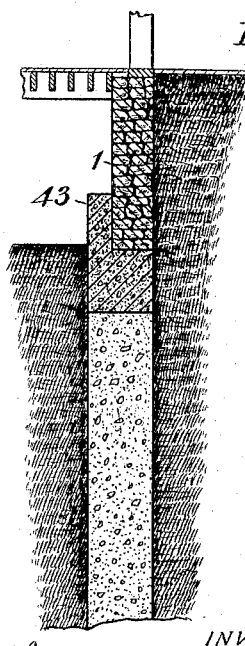
Fig. 11 is a section showing a method in which the underpinning may also be used to reinforce a foundation wall.

In Fig. 11, which shows a cross section through the underpinning and foundation wall, the span of the arch is shown extending up beyond the bottom of the foundation wall as at 43 to provide a further reinforcing for the wall. This construction may be utilized where the rubble wall or other foundation wall is in such poor condition that portions of the wall will give away under their own weight if the earth beneath it is excavated. In practice therefore, an envelope of concrete is initially placed around the inner face of the wall and under the bottom of the wall which will serve to reinforce the foundation wall and prevent it from falling apart when sections of earth beneath the wall are excavated.

Referring now to Fig. 12, here the building designated 45 is supported upon isolated piers, two such piers being shown and designated 46 and 47 which are supported upon stone footings 48 and 49, respectively. The method can also be utilized to underpin a building of this character and the first step of the method is shown in Fig. 13 where a concrete footing 50 is first placed in position to join the footings together. This concrete footing is constructed by digging a trench around and between the footings 48 and 49 without disturbing the supporting ground beneath the footings. In doing this the footings are preferably undercut as at 51 and 52 so that when the concrete is cast the portion of concrete footing between the footings serves as a key of a concrete arch provided by the concrete footing. The arching action of the concrete footing thus constructed is depended upon, as is the arching action of a foundation wall, to support the building while the pits are being sunk beneath the footings themselves and in Fig. 15 the pits are shown partially completed, one of the pits being filled with concrete to provide a pier 54 upon which the weight of the pier 47 is supported by temporary supports 55. After this pier has been constructed in this manner the haunch 56 of the pier may be constructed in the same manner as has been previously described. During the excavation of the pits it is of course to be understood that the same care should be exercised to prevent any displacement of the ground which might cause a cave-in and the pits are sheathed in the manner already described. Heretofore it has always been deemed necessary to strongly reinforce such an extended concrete footing and then excavate the pits so that only a portion of the earth beneath the pier is excavated. In practice I have found, however, that the arching action of this concrete footing is sufficient in itself to sustain the load of the building, even though the pit is sunk directly beneath one of the isolated piers or columns. It is therefore believed that such a concrete footing is therefore the equivalent of a foundation wall and it is intended that such a construction will be covered by the annexed claims.

In Fig. 17 a curtain wall is shown constructed beneath the isolated piers or columns. The method of constructing this curtain wall is in general, similar to the method of constructing the pier and arch support already described. In practice such a curtain wall is sometimes desirable, owing to the condition of the ground or the construction of a subway adjacent to such a wall or for other purposes. In constructing a curtain wall pits are sunk at spaced intervals and when a sufficient number of piers have been emplaced to entirely support the wall, the space intermediate the piers is then excavated and other piers sunk which are connected or joined to the first constructed piers to provide a curtain wall.

In Fig. 17 the concrete footing 60 is first placed in position to bend the supporting columns 61 and 62. Piers 63, 64, 65 and 66 would then be constructed and after these piers are erected and the foundation supported thereupon, the piers 67, 68 and 69 would be constructed, utilizing the method already described. By this method a curtain wall may be constructed beneath any type of foundation wall, such as a rubble wall, brick wall or other forms commonly used and it is the intention that such construction will come within the scope of the invention as set forth in the annexed claims.

In constructing the concrete piers and spans, a small space is sometimes left between the bottom of the foundation wall and the foundation wall and the foundation pier. These spaces are filled with grout in the usual manner.

It is to be noted in connection with the method described that the weight or load of the building and the foundation wall is gradually transferred from the earth directly beneath the wall to the pier and arch underpinning as it is completed so that when the underpinning is completed the weight or load of the building has been entirely transferred from the earth to the underpinning, the piers of which will transmit the load to a depth below the proposed excavation. When the new excavation is made the piers will support the entire weight of the building and the earth between the piers is not at all essential and may be removed if desired.

Various other modifications of the method may be employed, due to existing conditions and the judgment of the engineer in charge of the work. For example, in some instances it may be deemed advisable to use some temporary props or supports to sustain the building against lateral displacement. These props or supports will not at any time sustain the major load or weight of the building and it is intended that the use of such props or supports will not defeat the present method.

It is also evident that while concrete is preferably used, due to its cheapness and facility with which it may be placed in position, masonry piers or arches, or piers and arches of other material may be used if desired, it being intended that such masonry or other piers are the equivalent of the concrete piers and arches specified in the claims.

I claim:

1. The method of underpinning a building which consists in excavating sections of the earth beneath and in alignment with the foundation of the building while leaving it supported temporarily by its natural arching action and constructing in some of the excavations supporting piers and in other excavations members associated with and supported by the piers for supporting the portions of the foundations spanning the space between the piers.

2. The method of underpinning a building which consists in excavating sections of the earth beneath and in alignment with the foundation of the building while leaving it supported temporarily on its original bearings by its natural arching action and constructing in some of the excavations structural elements extending to relatively great depths and in other excavations arch-like structural elements associated with and supported by the first named elements to form therewith a new foundation for the building.

3. The method of underpinning a building which consists in excavating the earth from beneath spaced portions of a foundation wall of the building to form pits in alignment with the wall while leaving the wall temporarily supported above the pits by its arching action, constructing in each pit a pier to provide a permanent support for the wall, excavating the earth immediately below the wall and between the piers while leaving the wall temporarily supported above the excavation by its arching action, and constructing in such excavation a span joining the piers for supporting the wall lying between the piers.

4. The method of underpinning a building which consists in excavating a plurality of spaced pits beneath and in alignment with the foundation of the wall of the building while preventing displacement of the contiguous earth and leaving the wall temporarily supported above the pits by its arching action, constructing piers in the pits up to the bottom of the wall to support the wall permanently, excavating the earth immediately below the wall and between the pits while leaving the wall temporarily supported above the excavation by its arching action and constructing in such excavation a span joining the piers for supporting the wall lying between them.

5. The method of underpinning a building which consists in producing excavations beneath and in alignment with the foundation of the building while leaving it supported above each excavation as it is produced by the arching action of the foundation and forming in the excavations sections of a new foundation consisting of piers and arches supported by the piers.

6. The method of underpinning a building which consists in excavating spaced pits beneath and in alignment with the foundation wall of the building while leaving the wall temporarily supported above the pits by its arching action, constructing in the pits thus produced piers having their upper ends spaced from the under side of the wall, inserting temporary supports between the tops of the piers and the bottom of the wall, excavating the earth immediately below the wall and between the pits while leaving the wall temporarily supported above the excavation by its arching action and filling the excavation and the spaces around the temporary supports with concrete to provide in connection with the piers a permanent pier and arch support for the wall.

JOHN B. GOLDSBOROUGH.